(12) United States Patent
Yamanoue et al.

(10) Patent No.: US 12,149,103 B2
(45) Date of Patent: Nov. 19, 2024

(54) SECONDARY CELL SYSTEM

(71) Applicant: Imasen Electric Industrial Co., Ltd., Inuyama (JP)

(72) Inventors: Koichi Yamanoue, Inuyama (JP); Masayoshi Takahashi, Inuyama (JP); Daisuke Makio, Inuyama (JP)

(73) Assignee: Imasen Electric Industrial Co., Ltd., Inuyama (JP)

( * ) Notice: Subject to any disclaimer, the term of this patent is extended or adjusted under 35 U.S.C. 154(b) by 394 days.

(21) Appl. No.: 17/437,488

(22) PCT Filed: Feb. 12, 2020

(86) PCT No.: PCT/JP2020/005289
§ 371 (c)(1),
(2) Date: Sep. 9, 2021

(87) PCT Pub. No.: WO2020/202810
PCT Pub. Date: Oct. 8, 2020

(65) Prior Publication Data
US 2022/0158461 A1 May 19, 2022

(30) Foreign Application Priority Data
Apr. 2, 2019 (JP) ................ 2019-070526

(51) Int. Cl.
*H02J 7/00* (2006.01)
*B60L 58/22* (2019.01)

(52) U.S. Cl.
CPC .......... *H02J 7/0019* (2013.01); *H02J 7/0024* (2013.01); *B60L 58/22* (2019.02)

(58) Field of Classification Search
CPC ........ H02J 7/0019; H02J 7/0024; B60L 58/22
(Continued)

(56) References Cited

U.S. PATENT DOCUMENTS

2011/0074354 A1* 3/2011 Yano ................... H01M 10/482
180/65.29
2011/0084668 A1* 4/2011 Nakao ................... H02J 7/0019
320/149

(Continued)

FOREIGN PATENT DOCUMENTS

| | | |
|---|---|---|
| CA | 2915580 A1 | 1/2015 |
| EP | 3360719 A1 | 8/2018 |

(Continued)

OTHER PUBLICATIONS

International Application No. PCT/JP2020/005289, International Search Report & Written Opinion, 6 pages, Mar. 10, 2020.

(Continued)

*Primary Examiner* — Zixuan Zhou

(57) ABSTRACT

The present invention provides a high reliability secondary cell system in which a power supply is multiplexed without using a lead storage battery. This secondary cell system 10 has two or more battery groups comprising a plurality of cells 21 connected in series, each of the battery groups 11, 12, 13 is connected in parallel. Disposed in each battery group 11, 12, 13 are open/close switches 31*a*, 31*b*, 32*a*, 32*b*, 33*a*, 33*b* that disconnect the battery group from a circuit of the secondary cell system 10. This secondary cell system 10 can comprise an active balancer 14 connected in parallel with the battery groups 11, 12, 13.

20 Claims, 7 Drawing Sheets

(58) Field of Classification Search
USPC .......................................... 320/116–119, 126
See application file for complete search history.

(56) References Cited

U.S. PATENT DOCUMENTS

| | | | | |
|---|---|---|---|---|
| 2012/0262121 A1* | 10/2012 | Kuo | ..................... | H02J 7/0019 |
| | | | | 320/128 |
| 2013/0154567 A1* | 6/2013 | Peterson | ............... | H02J 7/0025 |
| | | | | 320/126 |
| 2016/0190828 A1 | 6/2016 | Nakamura et al. | | |
| 2016/0336736 A1 | 11/2016 | Nomura et al. | | |
| 2017/0106758 A1 | 4/2017 | Sakatani et al. | | |
| 2017/0324257 A1 | 11/2017 | Adaniya et al. | | |
| 2018/0219391 A1* | 8/2018 | Ishikawa | ................. | B60L 58/19 |

FOREIGN PATENT DOCUMENTS

| | | |
|---|---|---|
| EP | 3018791 B1 | 4/2019 |
| JP | 2002-345161 A | 11/2002 |
| JP | 2011-72153 A | 4/2011 |
| JP | 2011-182623 A | 9/2011 |
| JP | 2013-219994 A | 10/2013 |
| JP | 2013-247690 A | 12/2013 |
| JP | 2014-073051 A | 4/2014 |
| WO | 2014/054368 A1 | 4/2014 |
| WO | 2015/001703 A1 | 1/2015 |

OTHER PUBLICATIONS

European Patent Application No. 20785378.9, Extended European Search Report, 6 pages, Nov. 15, 2022.
Japanese Patent Application No. 2019-070526, Office Action, 5 pages, May 19, 2023.
Japanese Patent Application No. 2019-070526, Notice of Allowance, 5 pages, Jun. 23, 2023.

* cited by examiner

SECONDARY CELL SYSTEM

CROSS-REFERENCE TO RELATED APPLICATIONS

This application is a national stage of International Patent Application No. PCT/JP2020/005289, filed on Feb. 12, 2020; which claims priority to Japanese Patent Application No. 2019-070526, filed on Apr. 2, 2019; the entire contents of each of which is incorporated by reference herein.

TECHNICAL FIELD

The present invention relates to a secondary cell system capable of repeating charging and discharging. In particular, the present invention relates to a secondary cell system to be installed in a vehicle or the like to supply high-voltage electric power.

BACKGROUND

Secondary cell systems to be installed in vehicles are required to have high reliability and durability. When supplying electric power at a voltage of 12V to, for example, a vehicle, the reliability of conventional secondary cell systems is improved by installing two cell modules, a secondary cell capable of supplying power at 24V or higher, and a secondary cell capable of supplying 12V of power. In other words, the secondary cell capable of supplying power at 24V or higher is used as a primary side cell to supply power required for normal operation, and in case a problem occurs in the secondary cell on the primary side or in the generator, power is supplied from a secondary cell as an emergency power supply to resume control of the vehicle. Currently, in this type of secondary cell system, lead storage batteries are often used as the secondary cells.

International Patent Publication No. WO2015/015743 (equivalent to U.S. Patent Application Publication No. 2017/0106758, and also referred to herein as Patent Document 1) discloses a technique of using a lead storage battery to provide a highly reliable vehicular power source system. The vehicular power source system of Patent Document 1 discloses a configuration in which a hybrid power source and a lead storage battery are connected in parallel. The hybrid power source is configured with a secondary battery and a capacitor connected in parallel, and a power source controlling portion controls power supply of the hybrid power source and the lead storage battery.

SUMMARY OF THE INVENTION

Problems to be Solved by the Invention

Lead storage batteries can be produced from cheap materials, and are highly stable secondary cells that can endure discharging of large currents. On the other hand, since lead is used in the electrodes, the secondary cell system as a whole tends to become heavier. In addition, since sulfuric acid is used as the electrolyte solution, the danger in case of damage to the cell has been pointed out. There is therefore a demand for providing a highly reliable secondary cell system without using a lead storage battery.

The present invention was made in view of the above problem, and has an object of providing a highly reliable secondary cell system in which a power supply is multiplexed without using a lead storage battery.

Means for Solving the Problems

The invention according to Claim 1 relates to a secondary cell system having two or more battery groups consisting of a plurality of cells connected in series, each of the battery groups being connected in parallel. The secondary cell system according to the present invention is characterized in that there are provided open/close switches configured to disconnect each of the battery groups from a circuit of the secondary cell system.

The secondary cell system according to the present invention preferably includes an active balancer connected in parallel to the battery groups.

The secondary cell system according to the present invention preferably has the open/close switches configured to disconnect each of the battery groups from the circuit of the secondary cell system provided at connection portions between each of the battery groups and the active balancer.

Effects of the Invention

The secondary cell system according to the present invention has two or more battery groups consisting of a plurality of cells connected in series, each of the battery groups being connected in parallel. The power supply can be multiplexed by the battery groups connected in parallel, which improves reliability of the secondary cell system.

In the secondary cell system according to the present invention, even if a problem occurs in one of the plurality of battery groups connected in parallel, an operation of the open/close switches disconnects only the battery group in which a problem has occurred, allowing for charging and discharging to continue in a reduced state.

Since the secondary cell system according to the present invention enables multiplexing of the power supply, there is no need for a secondary side battery. This means there is no need for a lead storage battery, which have conventionally often been used as secondary side batteries. By eliminating the need for a lead storage battery, the secondary cell system as a whole becomes lighter, and the system can be configured at a cheaper cost.

DETAILED DESCRIPTION

Preferred embodiments of the secondary cell system according to the present invention will be described below.

In the present invention, a "cell" is the smallest unit constituting a battery. The cell has an anode, a cathode, and an electrolyte filled between the electrodes, and is also referred to as a unit cell. A battery referred to as a "cell" in the present embodiment is a secondary cell capable of charging and discharging. Depending on structure, known cells include lithium-ion cells, nickel-hydride cells, ELDC cells, etc. In the secondary cell system according to the present invention, lithium-ion cells in particular are preferably used.

In the present invention, a battery group is a serial connection of two or more cells. Of these battery groups, particularly an integrated combination of cells adjusted to have a specific voltage and capacity is also referred to as a battery module or a battery pack.

Figure 8:
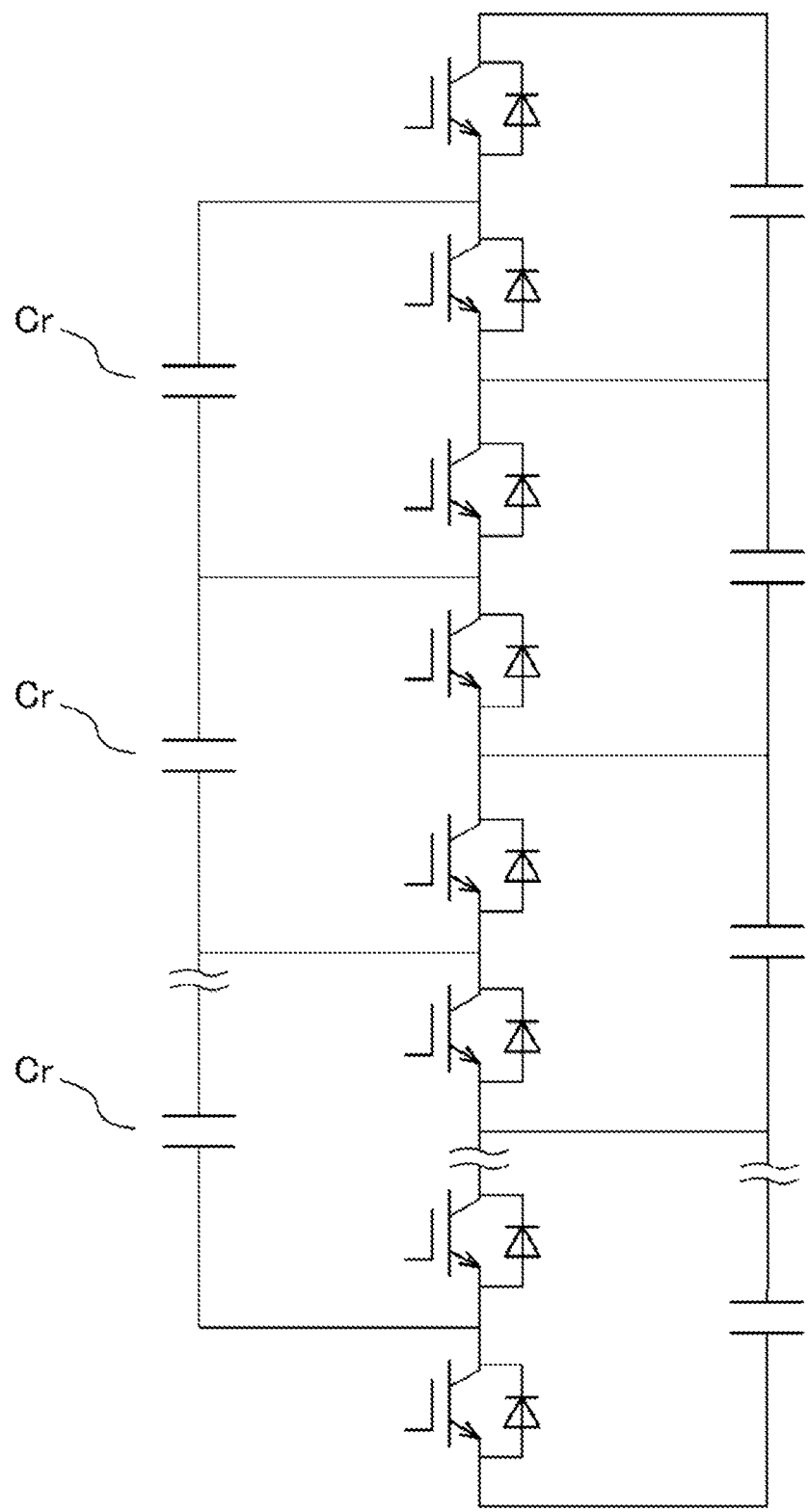
FIG. 8 shows an example of a configuration of an active balancer preferably used in the present invention.

In the present invention, an active balancer is a means that is connected to a plurality of cells and adjusts the charge and discharge state of each cell to balance control the voltage and capacity in order to prevent overcharging or overdischarging. The active balancer performs control to, for example, temporarily store power of a cell with a high state of charge in a capacitor, and redistribute the power to a cell with a low state of charge. FIG. 8 shows an example configuration of an active balancer preferably used in the present invention. The active balancer of FIG. 8 includes capacitors Cr and a half-bridge circuit that performs switching. The capacitors are connected to two adjacent cells via the half-bridge circuit. The capacitors Cr may also be connected via the half-bridge circuit to adjacent cell groups included in a battery group. In the mode of connection shown in FIG. 8, the capacitors Cr are connected in an alternately switching manner to one cell and another cell. If there is a potential difference between the connected cell and capacitor at this time, charge moves from the cell to the capacitor, or from the capacitor to the cell, whereby the charge is automatically balanced so that the potential difference between the cell and the capacitor is eliminated.

Figure 1:
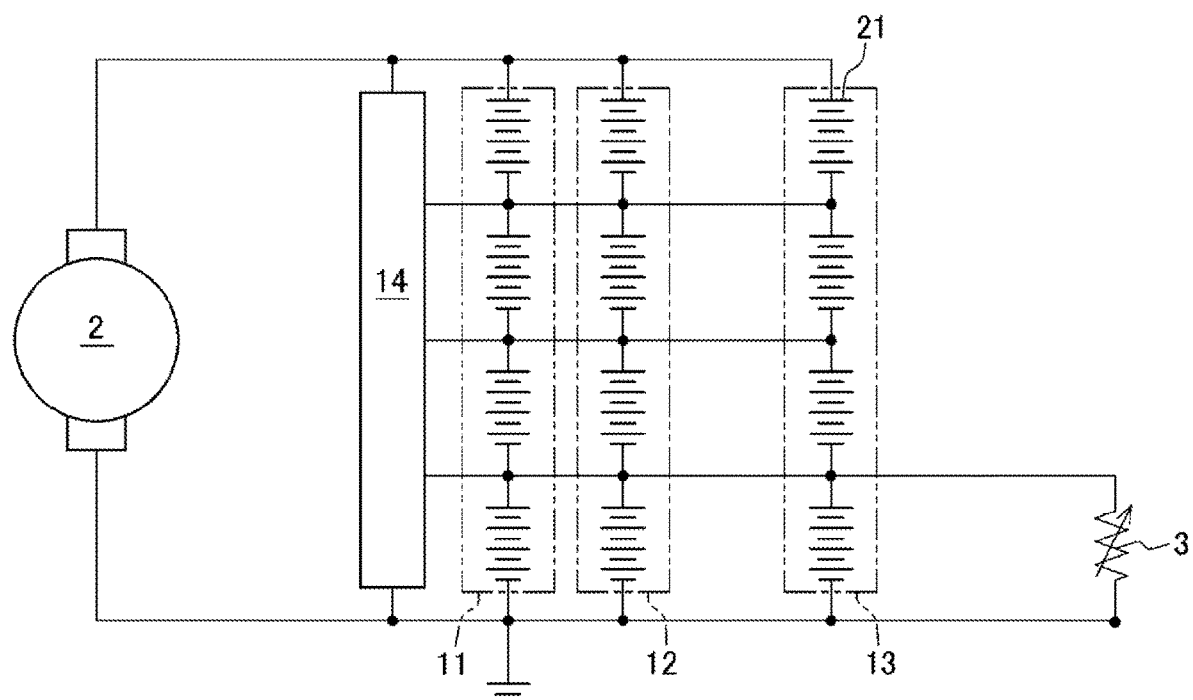
FIG. 1 is a block diagram schematically showing a summary of a secondary cell system according to an embodiment of the present invention.

A preferred embodiment of a secondary cell system 10 according to the present invention is described below with reference to FIGS. 1 to 3. In the present embodiment, a secondary cell system 10 capable of outputting 48V constitutes a secondary cell system for a vehicle supplying power with a voltage of 12V FIG. 1 schematically shows an outline of a secondary cell system 10 connected to a generator 2 and a load 3. The secondary cell system 10 includes a plurality of battery groups 11, 12, 13, and an active balancer 14 connected in parallel to the battery groups. The battery groups 11, 12, 13 are connected in parallel to each other. The battery groups 11, 12, 13 include a plurality of cells 21, each of which has the same capacity and voltage. The plurality of cells 21 are connected in series within each battery group 11, 12, 13. FIG. 1 shows, as an example, a configuration including 16 cells connected in series within each of the battery groups 11, 12, 13. In the battery groups 11, 12, 13, cells 21 are combined into respective units of four cells, and the ends of each cell group consisting of four cells 21 are provided with output terminals.

For example, if 3V cells are applied as the cells 21 in the secondary cell system 10 shown in FIG. 1, each of the battery groups 11, 12, 13 will have an output voltage of 48V. When one cell group including four cells 21 is selected and power is output from its output terminal, the output voltage will be 12V. In FIG. 1, power is supplied in parallel from one cell group of each of the battery groups 11, 12, 13, resulting in a supply of 12V of power to the load 3. It should be noted, however, that the number of cells combined within the battery groups and the number of cells arranged in series within the battery groups merely constitute one example, and the number of cells to combine and the total number to be arranged in series is not limited to the embodiment shown in FIG. 1.

Figure 2:
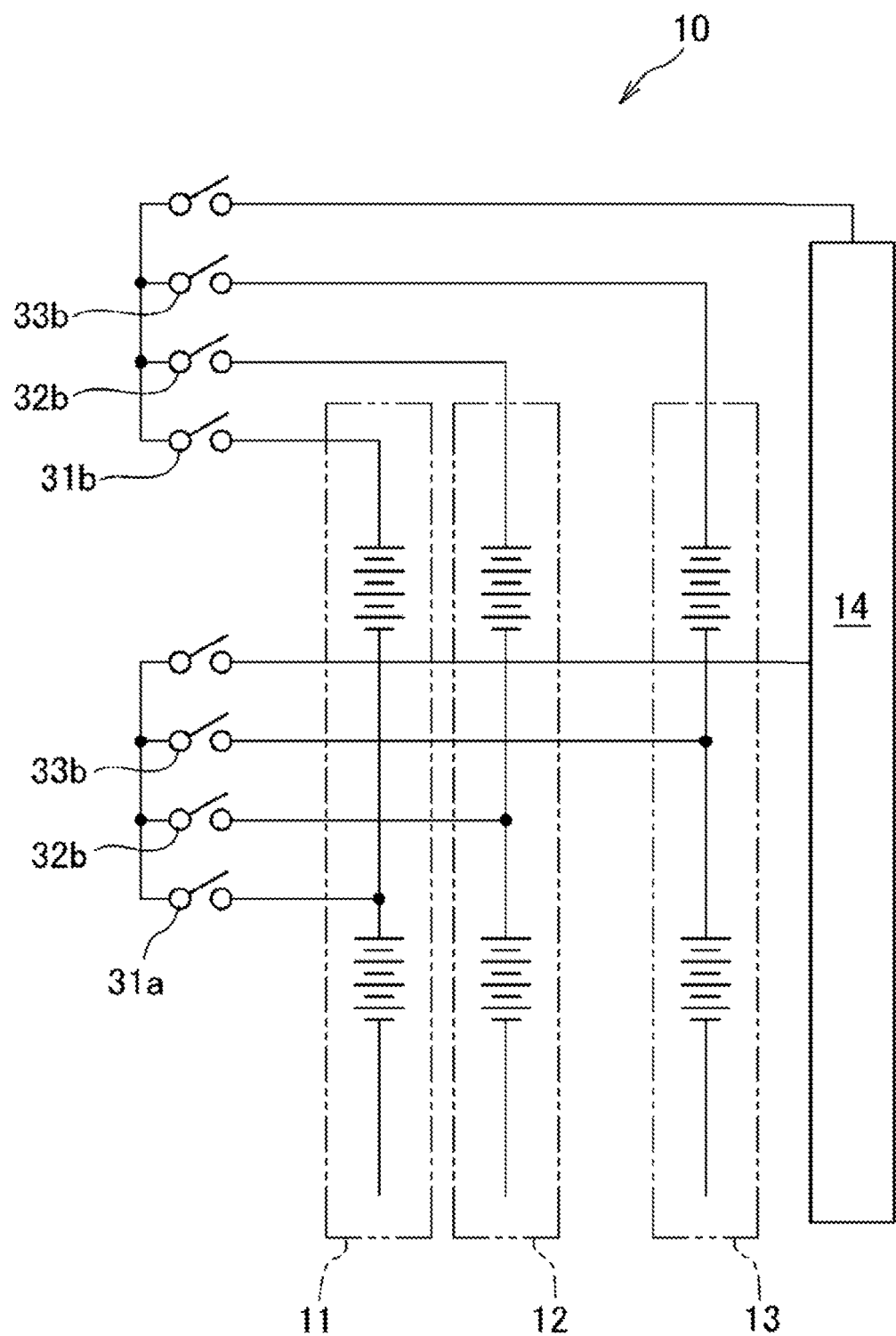
FIG. 2 schematically shows a connection state of battery groups and an active balancer of a secondary cell system according to an embodiment of the present invention.

FIG. 2 schematically shows an electrical connection mode of the battery groups 11, 12, 13 in the secondary cell system 10 and the active balancer 14 connected in parallel to the battery groups. Open/close switches 31a, 31b are arranged between the battery group 11 and the active balancer 14, in order to disconnect the battery group 11 from the secondary cell system if a problem occurs in the battery group 11. Similarly, open/close switches 32a, 32b are arranged between the battery group 12 and the active balancer 14. Open/close switches 33a, 33b are arranged between the battery group 12 and the active balancer 14.

Of the electrical connection locations of the respective battery groups 11, 12, 13 and the active balancer 14, it is preferable that the open/close switches be arranged in particular at the high-voltage side of the battery groups 11, 12, 13, and at the output location to the load 3. In addition, there is provided an open/close switch for disconnecting the active balancer 14 from the secondary cell system, which makes it easy to deal with problems in the active balancer 14 as well.

Figure 3:
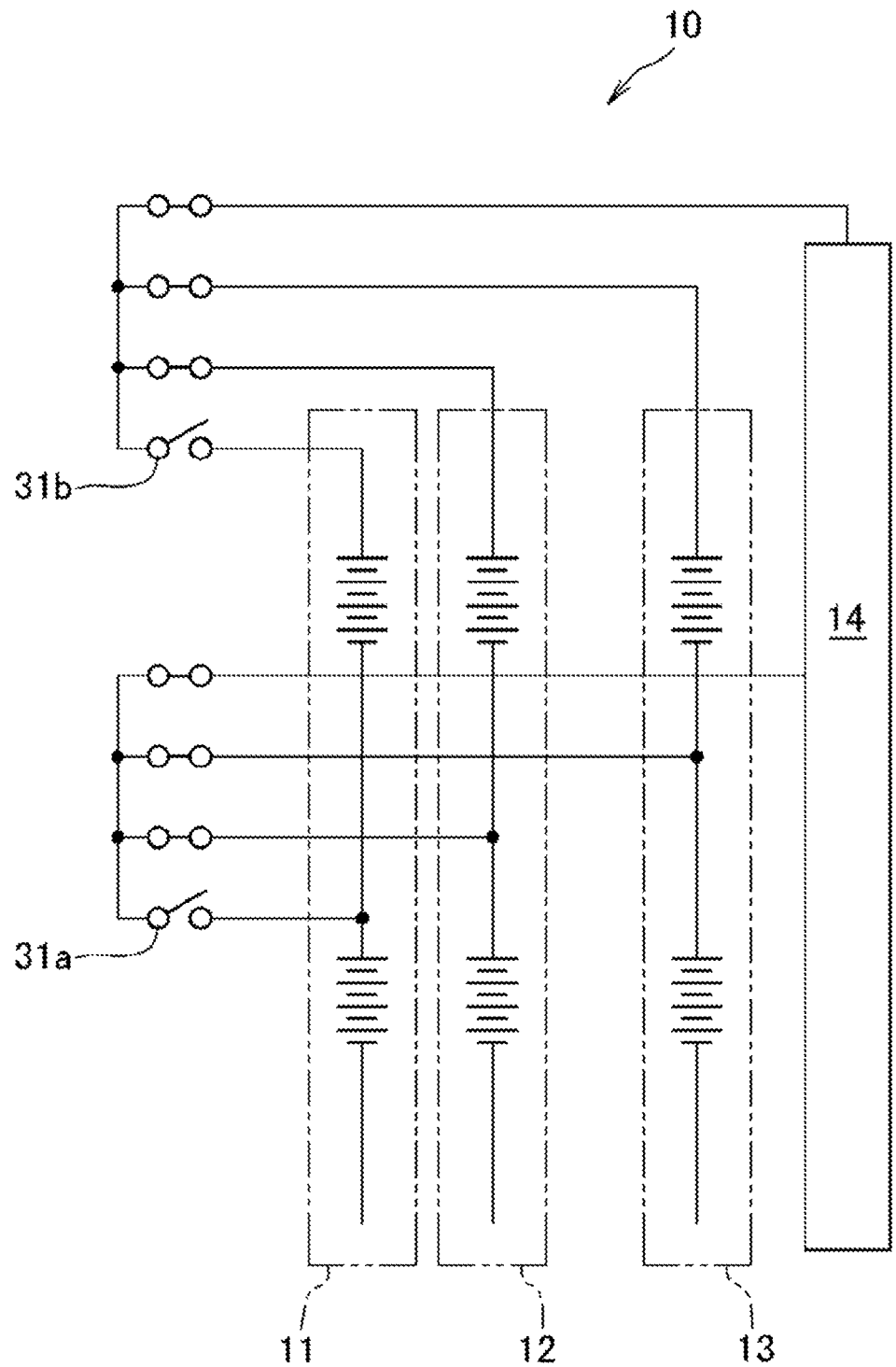
FIG. 3 schematically shows a disconnected state of an open/close switch when a problem has occurred in one of the battery groups.

FIG. 3 schematically shows a state in which the battery group 11 is disconnected by the open/close switches 31a, 31b when a problem has occurred in the battery group 11. By opening the open/close switches 31a, 31b, the battery group 11 is disconnected, while the battery groups 12, 13 can continue to discharge to supply power and allow the load 3 to operate. In this case, since the battery groups are connected in parallel, 12V of power can be supplied to the load 3 even after the battery group 11 has been disconnected. By multiplexing the power supply in this way, the secondary cell system 10 provides a highly reliable system without the need for a secondary side battery.

EXAMPLE 1

Figure 4:
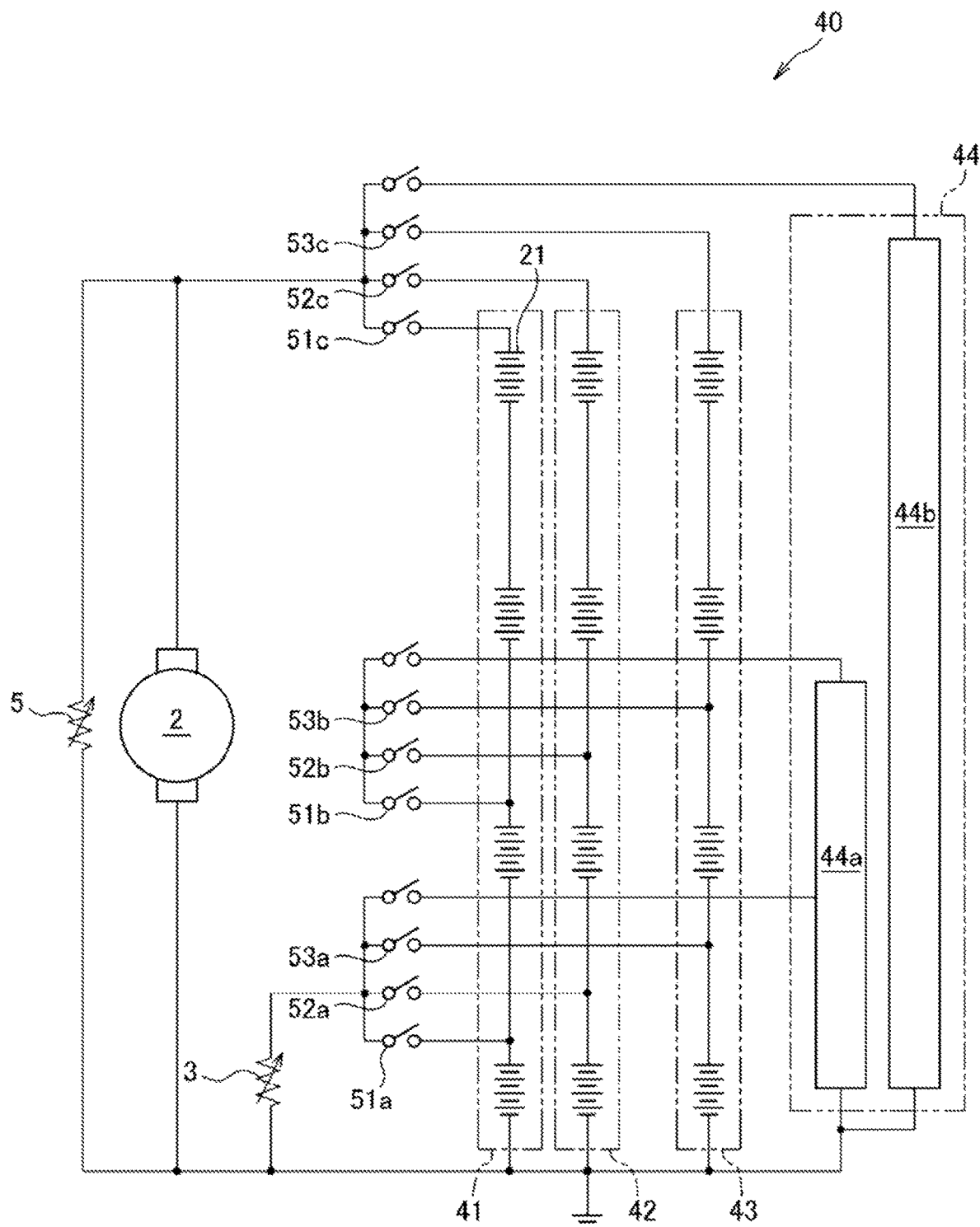
FIG. 4 schematically shows a secondary cell system according to Example 1.

FIG. 4 shows a circuit diagram of a secondary cell system 40 that embodies the present invention. The secondary cell system 40 of FIG. 4 is charged by a generator 2. After being charged, the secondary cell system 40 discharges to loads 3, 5. The load 3 is supplied with electricity at a voltage of 12V, and the load 5 is supplied with electricity at a voltage of 48V.

The secondary cell system 40 includes a plurality of battery groups 41, 42, 43 arranged in parallel with each other, and an active balancer 44 connected in parallel to the battery groups. Each of the battery groups 41, 42, 43 includes 16 cells 21, each of which has the same capacity and voltage. The cells 21 are combined into respective units of four cells, and the ends of each of the four cell groups consisting of four cells 21 are provided with output terminals.

The active balancer 44 is composed of a first balancer 44a that adjusts the balance of two adjacent cell groups within the battery groups 41, 42, 43 in particular, and a second balancer 44b that adjusts the balance of the battery groups 41, 42, 43 in their entirety.

In order to disconnect the battery group 41 from the secondary cell system 40 if a problem occurs in the battery group 41, open/close switches 51a, 51b are arranged between the battery group 41 and the active balancer 44a. Further, an open/close switch 51c is arranged between the battery group 41 and the active balancer 44b. By opening all of the open/close switches 51a, 51b, 51c, the battery group 41 is disconnected from the secondary cell system 40.

Similarly, open/close switches 52*a*, 52*b*, 52*c* are provided in order to disconnect the battery group 42 from the secondary cell system 40 if a problem occurs in the battery group 42. In addition, open/close switches 53*a*, 53*b*, 53*c* are provided in order to disconnect the battery group 43 from the secondary cell system 40 if a problem occurs in the battery group 43.

Thus, if a problem occurs in any of the battery groups 41, 42, 43, it is possible to disconnect only that battery group, while allowing the other battery groups operating normally to discharge, thereby supplying power respectively to the loads 3, 5.

EXAMPLE 2

Figure 5:
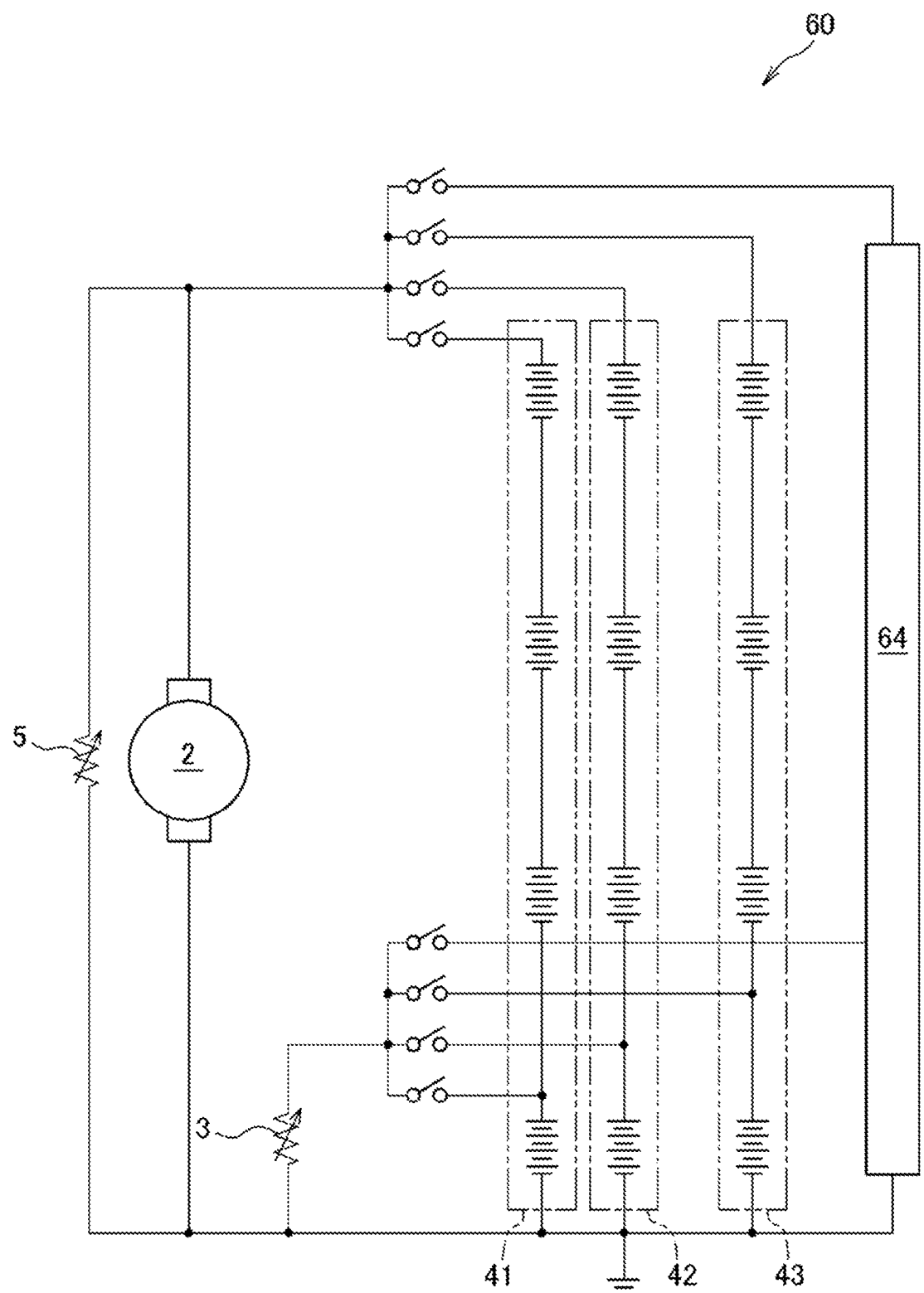
FIG. 5 schematically shows a secondary cell system according to Example 2.

FIG. 5 shows a circuit diagram of a secondary cell system 60 which is a second example. This example differs from Example 1 in that, instead of an active balancer, a DC-DC converter 64 is arranged in parallel with the battery groups 41, 42, 43. The DC-DC converter 64 is a chopper DC-DC converter, or an isolated DC-DC converter employing a transformer, and functions as a circuit for receiving power from all cells of the battery groups and supplying power to the battery groups connected by the open/close switches 52*a*, 52*b*, 52*c* and to the load 3.

The DC-DC converter 64 is respectively connected to three terminals of the of the battery groups 41, 42, 43. That is to say, it is connected to a high-voltage side terminal and a low-voltage side terminal of the battery groups 41, 42, 43, and a terminal in a position that divides the four cell groups within the battery groups 41, 42, 43 into one and three cells. Open/close switches are respectively arranged on the path connecting to the high-voltage side and on the path connecting to the terminal dividing the cell groups. Due to this connection mode, the voltage adjustment function of the DC-DC converter 64 functions equivalently to an active balancer that balances the voltage of the connected high-voltage side and low-voltage side within the battery groups 41, 42, 43 to a ratio of 3:1.

If a problem occurs in any of the battery groups 41, 42, 43, the secondary cell system 60 according to the present Example is also able to disconnect only the battery group in which a problem has occurred, while allowing the other battery groups operating normally to discharge, thereby supplying power to the loads.

COMPARATIVE EXAMPLE 1

Figure 6:
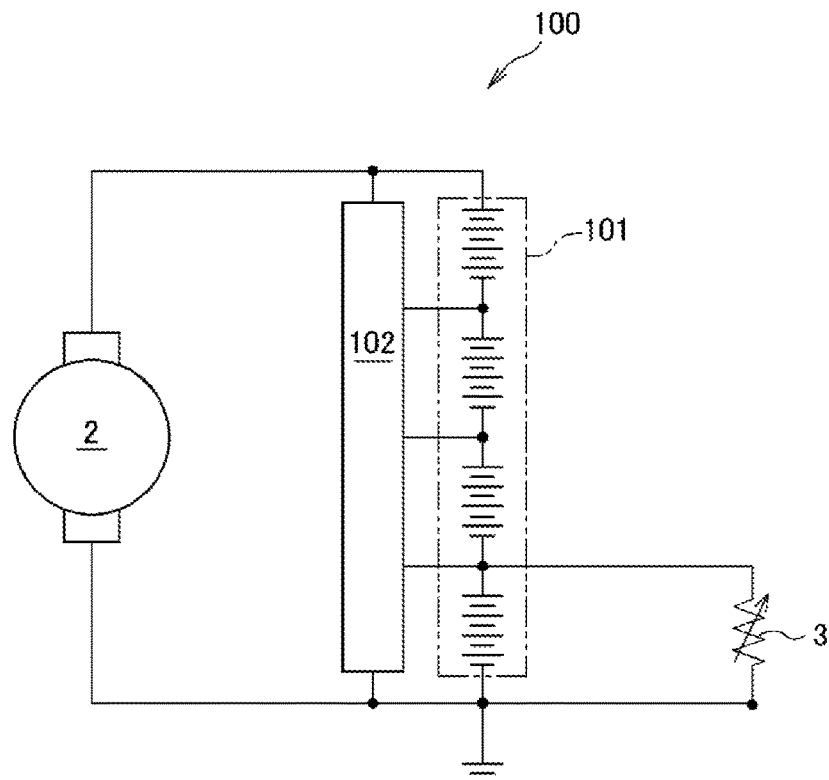
FIG. 6 schematically shows a secondary cell system according to Comparative Example 1.

As a comparative example of the present invention, FIG. 6 shows a configuration of a conventional secondary cell system 100. The secondary cell system 100 of FIG. 6 has one battery group 101, containing a plurality of cells connected in series, and a DC-DC converter 102 connected in parallel, and supplies power to a load after adjusting the voltage. Since the secondary cell system 100 does not multiplex the power supply, it is highly likely that supply of power to the load will stop if a problem occurs in the battery group 101.

COMPARATIVE EXAMPLE 2

Figure 7:
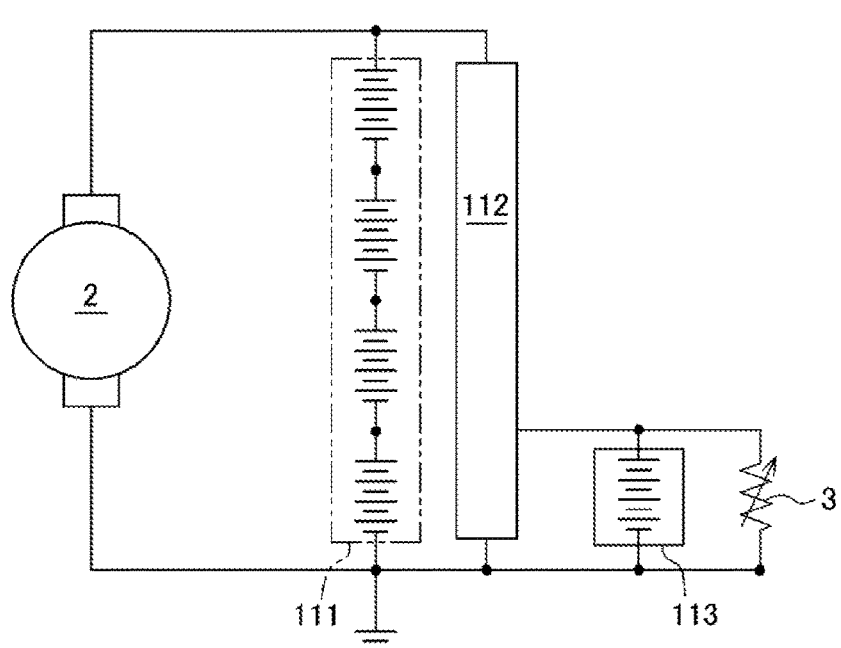
FIG. 7 schematically shows a secondary cell system according to Comparative Example 2.

As a comparative example of the present invention, FIG. 7 shows a configuration of a conventional secondary cell system 110. The secondary cell system 110 of FIG. 7 has one battery group 111, containing a plurality of cells connected in series, and an active balancer 112 connected in parallel, and further includes a lead storage battery 113 as a secondary side battery. The configuration of the secondary cell system 110 requires the lead storage battery 113 to improve reliability.

As described above, the secondary cell system according to the present invention has two or more battery groups consisting of a plurality of cells connected in series, and the battery groups are connected to each other in parallel, which makes it possible to multiplex the power supply and improve reliability of the secondary cell system.

The configuration of the secondary cell system described in the present Examples may be modified as necessary. For example, the number of cells to be connected and the number of cells to be combined may be modified as necessary according to the required output voltage. In addition, the number of battery groups to be connected in parallel may be increased in order to improve reliability. The configuration of the active balancer or DC-DC converter may also be modified as necessary.

INDUSTRIAL APPLICABILITY

In addition to vehicles, the secondary cell system according to the present invention may be preferably installed in any industrial machine.

DESCRIPTION OF THE REFERENCE NUMERALS

2 Generator
3, 5 Load
10, 40, 60, 100, 110 Secondary cell system
11, 12, 13, 41, 42, 43 Battery group
21 Cell
31*a*, 31*b*, 32*a*, 32*b*, 33*a*, 33*b* Open/close switch
51*a*, 51*b*, 51*c*, 52*a*, 52*b*, 52*c*, 53*a*, 53*b*, 53*c* Open/close switch
14, 44, 112 Active balancer
64, 102 DC-DC converter
Cr Capacitor

The invention claimed is:

1. A secondary cell system comprising:
two or more battery groups coupled to one another in parallel at a high-voltage terminal and a low-voltage terminal, wherein each battery group of the two or more battery groups includes:
two or more units of cells coupled to one another in series and including:
a first unit of cells coupled to the low-voltage terminal; and
at least a second unit of cells coupled to the high-voltage terminal; and
another terminal positioned between the first unit of cells and the at least a second unit of cells; and
a plurality of open/close switches configured to disconnect each battery group of the two or more battery groups from a circuit of the secondary cell system, wherein, for each battery group of the two or more battery groups, the plurality of open/close switches include:
a first open/close switch of the plurality of open/close switches coupled to and between the high-voltage terminal and the circuit; and
a second open/close switch of the plurality of open/close switches coupled to and between the another terminal and the circuit.

2. The secondary cell system of claim 1 further comprising an active balancer or a direct current (DC)-to-DC converter coupled to at least two of: the another terminal of each battery group of the two or more battery groups, the low-voltage terminal, and the high-voltage terminal.

3. The secondary cell system of claim 2, wherein the active balancer or the DC-to-DC converter is coupled in parallel to the low-voltage terminal and the high-voltage terminal.

4. The secondary cell system of claim 3, wherein the active balancer or the DC-to-DC converter is further coupled to the another terminal of each battery group of the two or more battery groups.

5. The secondary cell system of claim 2, wherein the active balancer or the DC-to-DC converter is coupled to the another terminal of each battery group of the two or more battery groups and the high-voltage terminal.

6. The secondary cell system of claim 5, wherein the active balancer or the DC-to-DC converter is further coupled to low-voltage terminal.

7. The secondary cell system of claim 2 further comprising at least one other open/close switch coupled to and between the active balancer or the DC-to-DC converter and the two or more battery groups, and configured to disconnect the active balancer or the DC-to-DC converter from the two or more battery groups.

8. The secondary cell system of claim 7, wherein the at least one other open/close switch includes:
    a first open/close switch coupled to and between the active balancer or the DC-to-DC converter and the another terminal of each battery group of the two or more battery groups; and
    a second open/close coupled to and between the active balancer or the DC-to-DC converter and the high-voltage terminal.

9. The secondary cell system of claim 1 further comprising:
    a first active balancer configured to adjust a balance between two adjacent units of the two or more units of cells within each battery group of the two or more battery groups; and
    a second active balancer configured to adjust a balance of the two or more battery groups in their entirety.

10. The secondary cell system of claim 1, wherein the circuit includes a load, and wherein the high-voltage terminal and the low-voltage terminal are configured to be coupled to the load.

11. The secondary cell system of claim 1, wherein the circuit includes at least one load, and wherein the low-voltage terminal and the another terminal of each battery group of the two or more battery groups are configured to be coupled to the at least one load.

12. The secondary cell system of claim 1, wherein the circuit includes a first load and a second load, wherein the high-voltage terminal and the low-voltage terminal are configured to be coupled to the first load, and wherein the low-voltage terminal and the another terminal of each battery group of the two or more battery groups are configured to be coupled to the second load.

13. The secondary cell system of claim 1, wherein the circuit includes a generator for charging the two or more battery groups.

14. The secondary cell system of claim 1, wherein each unit of the two or more units of cells includes the same number of cells.

15. The secondary cell system of claim 1, wherein each unit of the two or more units of cells includes a plurality of cells.

16. The secondary cell system of claim 15, wherein each cell of the plurality of cells has the same capacity.

17. The secondary cell system of claim 15, wherein each cell of the plurality of cells has the same output voltage.

18. The secondary cell system of claim 1, wherein each battery group of the two or more battery groups includes the same number of units of cells.

19. A secondary cell system comprising:
    two or more battery groups coupled to one another in parallel at a high-voltage terminal and a low-voltage terminal, wherein each battery group of the two or more battery groups includes:
        two or more units of cells coupled to one another in series and including:
            a first unit of cells coupled to the low-voltage terminal; and
            at least a second unit of cells coupled to the high-voltage terminal; and
        another terminal positioned between the first unit of cells and the at least a second unit of cells; and
    a plurality of open/close switches configured to disconnect each battery group of the two or more battery groups from a circuit of the secondary cell system, wherein, for each battery group of the two or more battery groups, the plurality of open/close switches include:
        a first open/close switch of the plurality of open/close switches coupled to and between the high-voltage terminal and the circuit; and
        a second open/close switch of the plurality of open/close switches coupled to and between the another terminal and the circuit,
    wherein the circuit includes at least one load, and
    wherein the two or more battery groups are configured to be coupled to the at least one load in the absence of a secondary side battery also coupled to the at least one load.

20. The secondary cell system of claim 19, further comprising an active balancer or a DC-to-DC converter coupled to the another terminal of each battery group of the two or more battery groups and the high-voltage terminal.

* * * * *